Aug. 11, 1959 H. B. IRWIN ET AL 2,898,632
MOLDING PLASTIC FOAM
Filed Oct. 19, 1955
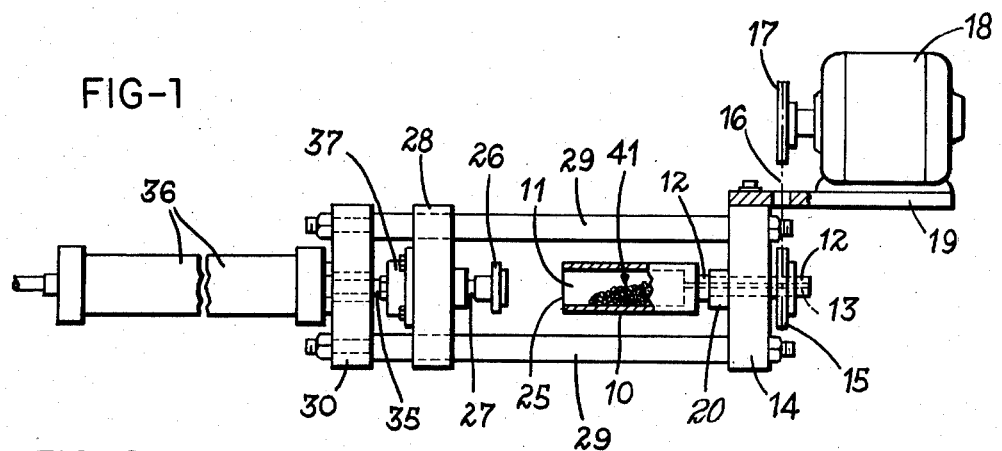
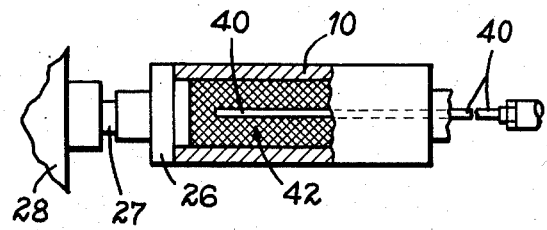
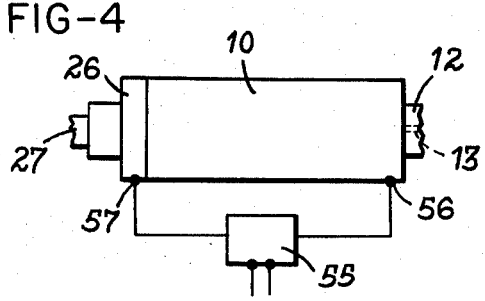
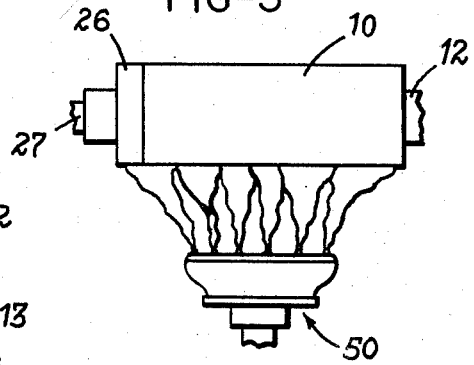
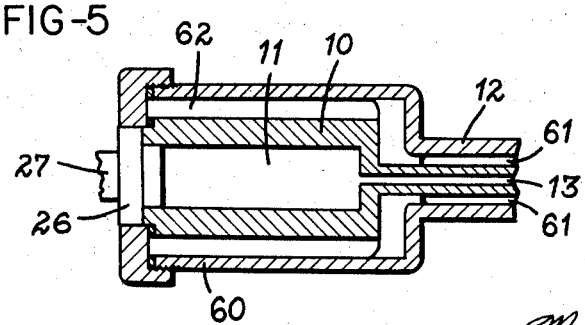
*INVENTORS*
HARRY BASIL IRWIN &
EUGENE R. WATERHOUSE
ATTORNEYS United States Patent Office 2,898,632
Patented Aug. 11, 1959

2,898,632

MOLDING PLASTIC FOAM

Harry Basil Irwin and Eugene R. Waterhouse, Dayton, Ohio, assignors to Dayton Formold, Inc., Dayton, Ohio, a corporation of Ohio Application October 19, 1955, Serial No. 541,376

8 Claims. (Cl. 18—48)

This invention relates to molding plastic foam and, more particularly, to a process for producing molded articles from plastic foam with a smooth glaze-like outer surface.

In the production of molded articles from plastic foam, such as expandable polystyrene foam and the like, beads of expandable polystyrene plastic are placed in a mold and then heated as by the injection of steam into the mold to cause the plastic beads to expand into a solid, light, aerated, foam which fills the mold cavity to produce an article of the desired shape composed of the light, solidified foam. The cellular or aerated foam structure of such an article, however, occurs throughout the molded article, including the surface thereof, leaving the article with a rough, sometimes irregular, pitted or cellular surface which, for many applications, is undesirable as being visually unpleasing, easily soiled, difficult to clean, difficult to decorate or color, and, when the article is to be affixed to another object as by adhesive, difficult to secure a firm adhesive bond.

If it is attempted, however, to subject a conventional article molded of plastic foam to heat and compacting pressure, etc., for the purpose of smoothing the surface thereof, excessive compacting may result which interferes with the desired lightness, small density, and foam or cellular structure of the article. Furthermore, such a procedure may add an additional manufacturing step unwarranted from the standpoint of economics, as well as being complicated and perhaps precluded if the particular article has an intricate or irregular shape and configuration.

According to the present invention, however, such a molded plastic foam article is produced with the outer surface thereof having a smooth glaze-like skin or finish providing a smooth, regular, relatively impervious outer surface on the article without interfering with the lightness or foam-type plastic structure. Furthermore, according to the invention, these enhanced surface characteristics are obtained in the original manufacturing process, preferably concurrently with the expansion mold of the article, and without the application of additional materials or surface treatment or compacting pressure of the molded article. The invention produces the desired surface in the mold, and so that the desired glaze-like surface of skin can be controllably provided on all or only a part of the article surface, of a controllable thickness as desired, and without limitation by the shape or configuration of the article.

It is a principal object of this invention to produce a molded article of expanded plastic foam with the article having a smooth, glaze-like outer surface and without substantially compacting or altering the foam structure and density of the article.

Another object of this invention is to provide a method for producing a glaze-like surface or skin of controllable thickness and surface smoothness on a molded article of plastic foam.

A further object of this invention is to provide a method for producing a glaze-like surface on a molded article of plastic foam during the molding of said article and independently of the shape of the molded article.

Still another object of this invention is to provide a method for the molding of articles from plastic foam in which expandable plastic beads are caused to produce a foam which is molded into the desired shape of the article and, preferably concurrently therewith, an outer glaze-like skin or surface of predetermined characteristics is formed on all or part of the molded article.

A still further object of this invention is to provide a method for the molding of articles from expanded plastic foam in which a glaze-like smooth surface is produced on the article in the mold.

Another object of this invention is to produce molded plastic foam articles having a glaze-like outer surface or skin thereover.

Other objects and advantages of this invention will be apparent from the following description, the accompanying drawings, and the appended claims.

In the drawing,

Fig. 1 is a somewhat diagrammatic showing of apparatus embodying and for practicing the invention;

Fig. 2 is a somewhat diagrammatic showing of the mold portion of Fig. 1 on a larger scale with the plastic foam expanded therein;

Fig. 3 is a somewhat diagrammatic showing of the mold portion of Fig. 1 being subjected to the external heating step of the invention; and Figs. 4 and 5 are somewhat diagrammatic showings indicating alternative types of apparatus for effecting the external heating step of the invention.

In practicing this invention, plastic beads or particles of expandable materials such as polystyrene are placed in a mold of the configuration desired for the finished product and, after the mold is closed, steam is injected thereinto. The expandable plastic beads are such that the injection of steam causes them to expand into a solid foam filling the mold cavity and, thus, producing a solid foam article of a shape corresponding to the mold cavity and composed entirely of the cellular or aerated plastic foam substance. Since the foam or cellular structure extends throughout the molded article, an article so molded has an outer surface which is rough and irregular and which, accordingly, is easily soiled, difficult to clean, and, should it be desired to affix the molded part to another object as by adhesive, the irregular surface interferes with the forming of a good adhesive bond.

It has been found, however, that if the walls of the mold cavity are heated rapidly to a relatively high temperature as the plastic is expanding, the expanding foam in contact with the heated mold walls may be melted or softened sufficiently to form a thin skin over all or part of the outer surface of the molded article. Thus, if the inner walls of the mold cavity are smooth or polished, this smooth or polished surface can be imparted to the outer surface of the molded article as the expanding plastic foam contacts the heated mold walls. Then, by rapidly quenching or cooling the mold walls, the depth or thickness of the melted glaze-like skin can be controlled within desired limits. Instead of a smooth surface configuration, the outer surface of the article may be given various surface characteristics by providing a mold cavity with appropriately treated or configured inner walls.

Referring to the drawings, in which like reference characters designate like parts throughout the several views, Fig. 1 illustrates somewhat diagrammatically apparatus embodying and for practicing this invention to produce the desired molded article. The mold 10 is diagrammatically illustrated as having a cavity 11 such as to form a cylindrical molded article, although it will be understood that the shape and configuration of the mold cavity 11 is provided according to the shape of molded article desired.

Mold 10 is mounted on a shaft 12 rotatably carried by a bearing 20 in a supporting block 14. Shaft 12 has an axial bore 13 for the insertion therein of a steam probe as described below, and carries a sprocket wheel 15 driven to rotate shaft 12 and mold 10 by means of a chain drive indicated at 16 and driven by sprocket 17 on an electric motor 18 mounted on a bracket 19 affixed to supporting block 14.

As indicated, the end 25 of mold 10 is open, and a mold cover 26 is provided to close the mold during molding of the article as indicated in Fig. 2. Cover 26 is carried by a shaft 27 supported on a sliding block 28 so as to be coaxially aligned with mold 10.

Sliding block 28 is mounted for axial sliding movement on rods 29 affixed between supporting block 14 and a corresponding supporting block 30. A shaft 35 passes slidably through supporting block 30 and connects sliding block 28 with a pneumatic or hydraulic cylinder and piston motor indicated at 36 which provides for sliding block 28 along rods 29 to close mold 10 with mold cover 26 and hold cover 26 tightly in closed position in mold 10 against the force of steam and the expanding foam. Shaft 27 is mounted for rotation in sliding block 28 by means of bearing 37 so that cover 26, when in the closed position indicated in Fig. 2, is free to rotate with mold 10 as the latter is rotated by motor 18.

As noted above, shaft 12, carrying mold 10, has an axial bore 13 for the insertion of a steam probe 40 therethrough and into the mold cavity to inject steam into the cavity 11 after mold 10 is closed to cause expansion of the plastic therein.

In the operation of the apparatus above described, expandable plastic beads are placed in the cavity 11 of the mold 10 as indicated generally by 41 in Fig. 1. The mold 10 is closed by moving mold cover 26 into the closed position indicated in Fig. 2 by sliding block 28 to the right in Fig. 1 under the action of cylinder 36. Motor 18 is started to rotate mold 10 about its longitudinal axis, and steam probe 40 is inserted through bore 13 in shaft 12 to inject steam into mold cavity 11, thereby causing the beads 41 to expand and form the desired plastic foam which fills the cavity 11 of mold 10 as indicated by the numeral 42 in Fig. 2 producing a molded article having the same configuration as that of cavity 11 in mold 10. Thereafter or preferably, concurrently with the injection of steam through probe 40, mold 10 is heated from the outside so that the inner walls of cavity 11 thereof are quickly raised to a relatively high temperature sufficient to melt or soften the outer surface of the expanding foam adjacent the walls of cavity 11. This softening of the outer surface of the expanding foam produces the desired glaze-like surface skin having smoothness or surface characteristics corresponding to those of the inner walls of cavity 11.

A relatively thin softened surface area is desired—e.g., .001 to .02 inch thick—and, after heating the inner walls of mold 10 quickly to a temperature sufficient to melt or soften the outer surface of the expanding foam, mold 10 is quickly cooled or quenched with refrigerated water before sufficient heat can be transferred to the expanded foam within mold 10 to cause melting of more than the surface area thereof or collapsing or interruption of the desired internal cellular structure of the foam.

As indicated in Fig. 3, such external heating of mold 10 is satisfactorily accomplished with a flame burner or heater indicated diagrammatically at 50 acting upon the outside of mold 10 as it is rotated on shaft 12 by motor 18. Alternatively, such external heating of mold 10 can be effected by an electrical resistance heating arrangement indicated in Fig. 4 as comprising a source of electric power 55 connected to mold 10 at 56 and cover 26 at 57 to provide for rapidly heating the walls of mold 10 by resistance as electric current is passed therethrough. Instead of resistance heating, electrical heating is also achieved by surrounding the mold with induction coils in known manner. Or, as indicated in Fig. 5, mold 10 is provided with a surrounding heating and cooling jacket 60 connected through shaft 12 by a passage 61 concentrically surrounding bore 13 for steam probe 40 so that steam and quenching water can be sequentially interjected through passage 61 into the cavity 62 between mold 10 and jacket 60 for quickly heating and then quenching the walls of mold 10.

Satisfactory results according to this invention have been achieved using as the starting plastic material beads of so-called "expandable polystyrene" manufactured and sold commercially, and for the purpose of making molded articles of expandable polystyrene foam, by the Dow Chemical Company and Koppers Co. Although the chemical composition of this starting material is not known by the applicant here and is not made available by the manufacturers of the material it is a well-known commercial product manufactured and sold for this purpose. In particular, satisfactory results have been obtained using the material sold by the Koppers Co. as "Koppers Dylite Expandable Polystyrene Beads F20, F30, and F40." Such expandable polystyrene has a melting or softening range of approximately 300° to 450° F.

If the molded foam article is subjected to a prolonged period to a temperature much in excess of 450° or 500° F., the plastic will be sufficiently melted for the foam to collapse destroying the cellular structure and configuration of the article. It should accordingly be noted that, although the walls of mold 10 may be heated according to this invention to a temperature which may rise within or exceed the melting range of the plastic foam (e.g., 500° F.), this heating is maintained for a very short time (e.g., approximately 15 seconds to several minutes depending upon the size of the molded article) when the mold 10 is cooled quickly as by means of quenching with refrigerated coolant before sufficient heat can be transferred into the expanded plastic foam to cause softening or melting of more than the surface skin or collapse of the article or destruction of the desired cellular composition thereof.

Satisfactory results have been obtained according to the invention using for mold 10 a so-called shell mold. Such a mold, as is well understood, is constructed of relatively thin sheet metal walls of brass or steel of sufficient strength to withstand the internal pressure of the injected steam and expanded foam and yet of sufficient thinness to provide adequate and rapid heat transfer therethrough during the rapid heating and cooling of the mold walls according to the invention. As illustrative of such a shell mold, satisfactory results have been obtained in the production of an ovaloid molded article approximately an inch and one-half by three inches in size with a stainless steel mold having a wall thickness of no more than approximately 3/16 of an inch. Such shell molds are preferably chromium plated on the interior to enhance the releasability of the expanded plastic article from the inner walls thereof.

As illustrative of the operation of a process according to this invention and considering for purposes of illustration the ovaloid object mentioned above, satisfactory results have been obtained by injecting steam at 50 pounds pressure into the expandable polystyrene beads placed in the interior of the closed mold for approximately 15 to 45 seconds to cause expansion of the beads to form the desired plastic foam. Concurrently a rapid heating up to 350° to 500° F. was applied to the outside of the shell mold for approximately the same 15 to 45 seconds, and then the mold was quenched by spraying with refrigerated water for approximately 15 to 30 seconds. Such a sequence of steps produces, on the molded article referred to, a glaze-like surface skin approximately .005 inch thick.

As will be understood, of course, the times and temperatures necessary to provide the desired surface treatment will vary somewhat according to the size of the molded part, the thickness of surface skin desired, the thickness and heat transfer characteristics of the mold walls, etc. It should be noted, however, that the temperature of the mold walls should be brought up as quickly as possible into the melting range of the plastic within since better results are obtained with a high heat for a short time than are obtained with a lower heat for a longer time. Also the mold should be quenched as quickly as possible after the external heating is completed to avoid transfer of sufficient heat into the interior of the molded article to cause collapse or destruction of the cellular structure thereof.

The time for the external heating, as well as the time necessary for complete expansion of the plastic within the mold, will depend to some extent upon the size of the molded article and, consequently, the surface area thereof and the amount of plastic within the mold. With larger articles than that mentioned above, this time may extend to three to four minutes. The length of time the external heating is applied will also be governed to some extent by the thickness of glaze-like skin desired, as well as such considerations as whether the entire surface of the molded article is to be treated or only a portion thereof. That is, not only the thickness of the skin is controllable according to this invention but also the extent thereof over the outer surface of the article, since the application of external heat to but a portion of the mold walls results in the production of the glaze-like skin over only the corresponding portion of the molded article surface.

Generally, since the thickness of the skin is determined to a large extent by the length of time elapsed after the mold walls are heated and before they are cooled, it may be noted that, within the temperature ranges mentioned, this portion of the time cycle extends from approximately 10 to 60 seconds for the production of a skin from approximately .001 to 0.2 inch thick. Also, and particularly with regard to flame heaters for the exterior of the mold, the rotation of the mold during the molding process facilitates uniform external heating and the full use of steam within the mold, and aids in the dispersing of the expandable beads to force the expanded foam against the surface of the mold cavity to cause the foam to soften or melt and form the thin surface skin desired.

Accordingly, the methods and apparatus of the present invention produce a light, cellular molded article of plastic foam having on the surface thereof a glaze-like skin of the desired characteristics, and this is done without subjecting the molded article to compacting pressure which might destroy even a portion of the cellular structure thereof and concurrently with the molding of the article in an economical and simple manner and by a method which is independent of the shape or the article.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In a process for producing molded plastic foam articles having a glazed surface and a predetermined melting temperature, the steps which comprise introducing expandable plastic beads into a mold having a heat conducting surface of predetermined surface smoothness characteristics on the inner walls thereof, injecting steam into said mold effecting expansion of said expendable beads to fill said mold with expanded plastic foam, concurrently heating said inner walls of said mold to a temperature at least as high as said melting temperature of said plastic foam for a limited time sufficient to cause melting of the surface only of said expanded foam against said inner mold walls, and cooling said mold walls rapidly before more than only the surface of said expanded foam is melted by said heating step to form a glazed outer skin on said article corresponding to said surface smoothness characteristics of said mold walls.

2. In a process for producing molded plastic foam articles from expanded polystyrene foam and having a glazed surface, the steps which comprise introducing expandable polystyrene beads into a mold having a heat conducting surface of predetermined surface smoothness characteristics on the inner walls thereof, heating said inner walls of said mold to a temperature at least as high as the melting point of said polystyrene beads for a limited time sufficient to cause melting of a portion of said beads and thus forming a molten skin over said inner walls of said mold, concurrently causing steam to expand in said mold and thus effecting expansion of said polystyrene beads therein to fill said mold with expanded polystyrene foam, said expanded foam urging said skin against said inner walls of said mold to conform to said surface smoothness characteristics thereof, and cooling said mold walls rapidly before more than only a relatively thin surface layer of said expanded foam is melted by said heating step to form said article having a glazed outer surface corresponding to said surface smoothness characteristics of said mold walls.

3. In a process for producing molded plastic foam articles having a glazed surface, the steps which comprise introducing expandable plastic beads into a mold, causing steam to expand in said mold and thus effecting expansion of said beads to fill said mold with expanded plastic foam, heating the walls of said mold for a limited time sufficient to cause melting of a portion of said beads at said walls of said mold, and cooling said mold rapidly before more than a relatively thin surface layer of said expanded foam is melted by said heating step to form a glazed outer skin on said article.

4. In a process for producing molded plastic foam articles having a glazed surface and a predetermined melting temperature range, the steps which comprise introducing expandable polystyrene beads into a mold, causing steam to expand into said mold and thus effecting expansion of said beads to fill said mold with expanded plastic foam, heating the walls of said mold to a temperature within the melting range of said plastic foam for a limited time sufficient to cause melting of a portion of said beads at said walls of said mold, and quenching said mold walls rapidly to below said melting range before more than a relatively thin surface layer of said expanded foam is melted by said heating step to form a glazed outer skin on said article.

5. In a process according to claim 3 in which said plastic foam is polystyrene foam having a melting temperature within the range of about 300° to 450° F. and in which said heating of the walls of said mold is to a temperature range of about 350° to 500° F. and said cooling of said mold walls is effected after said heating step by quenching thereof rapidly to a temperature below said melting temperature.

6. In a process according to claim 5 in which said heating step of said mold walls is only for a limited time interval of about 15 seconds to 4 minutes and sufficient to cause melting of only portions of said foam adjacent and cast against said mold walls.

7. In a process for producing molded plastic foam articles having a glazed surface, the steps which comprise introducing expandable plastic beads into a mold, introducing steam into said mold and thus effecting expansion of said beads to fill said mold with expanded plastic foam, heating the walls of said mold for a limited time sufficient to cause melting of a portion of said beads at said walls of said mold, cooling said mold rapidly before more than a relatively thin surface layer of said expanded foam is melted by said heating step to form a glazed outer skin on said article, and maintaining said melted portion of said beads at the outer surface of said article in contact with said mold walls during said heating and cooling steps to form on the outer surface of said article a surface configuration corresponding to said mold walls.

8. In a process according to claim 3 in which said mold is rotated during said step of heating the walls thereof and thus effecting substantially uniform distribution of said melting portion of said plastic over said walls of said mold for forming said relatively thin surface layer of substantially uniform thickness against said walls.

References Cited in the file of this patent

UNITED STATES PATENTS

| | | |
|---|---|---|
| 1,792,813 | Campbell | Feb. 17, 1931 |
| 1,995,977 | Gonda | Mar. 26, 1935 |
| 2,256,483 | Johnston | Sept. 23, 1941 |
| 2,774,291 | Stastny et al. | May 8, 1956 |

OTHER REFERENCES

Plastics World, March 1954, page 4, "Foaming Agent Impregnated Polystyrene Beads," Cleworth Publishing Co., Inc.

UNITED STATES PATENT OFFICE

CERTIFICATE OF CORRECTION

Patent No. 2,898,632                                                August 11, 1959

Harry Basil Irwin et al.

It is hereby certified that error appears in the printed specification of the above numbered patent requiring correction and that the said Letters Patent should read as corrected below.

Column 8, line 7, list of references cited, for 2,774,291   Stastny   et al. - - - - May 8, 1956 read 2,744,291 Stastny   et al. - - - - May 8, 1956

Signed and sealed this 9th day of February 1960.

(SEAL)
Attest:

KARL H. AXLINE
Attesting Officer

ROBERT C. WATSON
Commissioner of Patents